United States Patent [19]
Shin et al.

[11] Patent Number: 6,164,129
[45] Date of Patent: Dec. 26, 2000

[54] APPARATUS AND METHODS FOR MONITORING SYSTEM ENVIRONMENT OF OUTDOOR BASE STATION

[75] Inventors: Da-Hyun Shin; Jun-Sung Lee, both of Seoul, Rep. of Korea

[73] Assignee: Samsung Electronics Co., Ltd., Rep. of Korea

[21] Appl. No.: 08/987,441

[22] Filed: Dec. 9, 1997

[30] Foreign Application Priority Data

Feb. 20, 1997 [KR] Rep. of Korea ......................... 97-5078

[51] Int. Cl.[7] ....................................................... G01W 1/00
[52] U.S. Cl. ....................................................... 73/170.16
[58] Field of Search ........................... 73/170.16, 170.11; 340/601, 585, 521

[56] References Cited

U.S. PATENT DOCUMENTS

| | | | |
|---|---|---|---|
| 4,668,940 | 5/1987 | Beard et al. | 340/521 |
| 5,801,632 | 9/1998 | Opal | 340/585 |
| 5,918,276 | 6/1999 | Grindle et al. | 73/170.11 |

*Primary Examiner*—Benjamin R. Fuller
*Assistant Examiner*—Jewel V. Thompson
*Attorney, Agent, or Firm*—Dilworth & Barrese, LLP

[57] ABSTRACT

According to the present invention, apparatus and methods are provided for monitoring the environment of an outdoor base station to protect the outdoor base station from variations of the environment. An apparatus according to an embodiment of the present invention includes an environment monitor for monitoring the environment of the outdoor base station, for transmitting a command for power shutdown upon detecting a fatal state of environment, and for transmitting a command for resuming power upon detecting a lapse of the fatal state. A power supply control unit shuts down power supplied to the outdoor base station in response to the command for power shutdown from the environment monitor, and resumes power to the outdoor base station in response to the command for resuming power from the environment monitor.

16 Claims, 4 Drawing Sheets

APPARATUS AND METHODS FOR MONITORING SYSTEM ENVIRONMENT OF OUTDOOR BASE STATION

BACKGROUND OF THE INVENTION

1. Field of the Invention

The present invention relates to a base station of a cellular system and, more specifically, to apparatus and methods for monitoring a system environment of an outdoor base station.

2. Description of the Related Art

In conventional cellular systems, base stations are typically located within buildings or similar structures. Thus, there is little, if any, direct effect on base station operations due to variations in environmental conditions (e.g., rain, snow, etc). However, due to the increasing difficultly in securing indoor base stations, service providers have recognized the need for securing cost-efficient, yet reliable, outdoor base stations.

Thus, base stations have been installed on rooftops or other outdoor locations. However, since these base stations are directly exposed to environmental conditions, it is to be appreciated that monitoring such base stations during varying environmental conditions to ensure that they are operating normally is of great significance. Accordingly, environmental monitors for outdoor base stations have been developed. These conventional monitors have been located at the outdoor base station and perform functions such as temperature/moisture sensing, fire sensing, inundation sensing, and door open sensing. Thus, conventional monitors recognize the state of the system environment. The recognized state is processed as alarm information and is reported to an upper system which operates the maintenance and the repairing of outdoor base stations based on the reported information. The upper system may be, for example, a Mobile Switching Center (MSC) of a Base Station Controller (BSC) which controls a Base Station Transceiver (BTS) system, or more specifically, a Base Station Manager (BSM) connected with a Mobile Switching Center (MSC). The BSM initializes, maintains, operates, and reviews operation of the BSC and BTS. Additionally, in the case that a BSM transmits the relative information, the upper system may also be an Operation and Maintenance Center (OMC). Moreover, in the case that an environment host is installed in place of an MSC, the environment host can be the upper system.

It is to be appreciated that even though a conventional monitor may recognize a fatal state of the system environment (i.e., a state where it is desirable to shutdown the power to certain equipment in the base station to prevent it from harm due to the environmental conditions; thus what is deemed a fatal condition may vary according to the robustness of the equipment), the monitor does not embody protective functions or features. Also, while variations of the system environment are reported to the upper system, the temperature and moisture levels of the system cannot be adjusted according to the variations. Thus, optimum operation of the system is not achieved.

SUMMARY OF THE INVENTION

It is an object of the present invention to provide apparatus and methods for protecting an outdoor base station during fatal environmental conditions.

Another object of the present invention is to provide apparatus and methods for ensuring optimum operation of an outdoor base state despite variations of the external environment of the base station.

According to the present invention, apparatus and methods for monitoring the environment of an outdoor base station to protect the base station from variations of the environment are provided. An apparatus according to an embodiment of the present invention includes an environment monitor for monitoring the environment of the outdoor base station, for transmitting a command for power shutdown upon detecting a fatal state of environment, and for transmitting a command for resuming power upon detecting a lapse of the fatal state. A power supply control unit shuts down power supplied to the outdoor base station in response to the command for power shutdown from the environment monitor, and resumes power to the outdoor base station in response to the command for resuming power from the environment monitor. Also, an air conditioner adjusts the temperature and the moisture of the system in accordance with variations of the system environment, in order to maintain an optimum operation state.

These and other objects, features and advantages of the present invention will become apparent from the following detailed description of illustrative embodiments thereof, which is to be read in connection with the accompanying drawings, in which like reference symbols indicate the same or similar components.

DETAILED DESCRIPTION OF THE PREFERRED EMBODIMENT(S)

Figure 1:
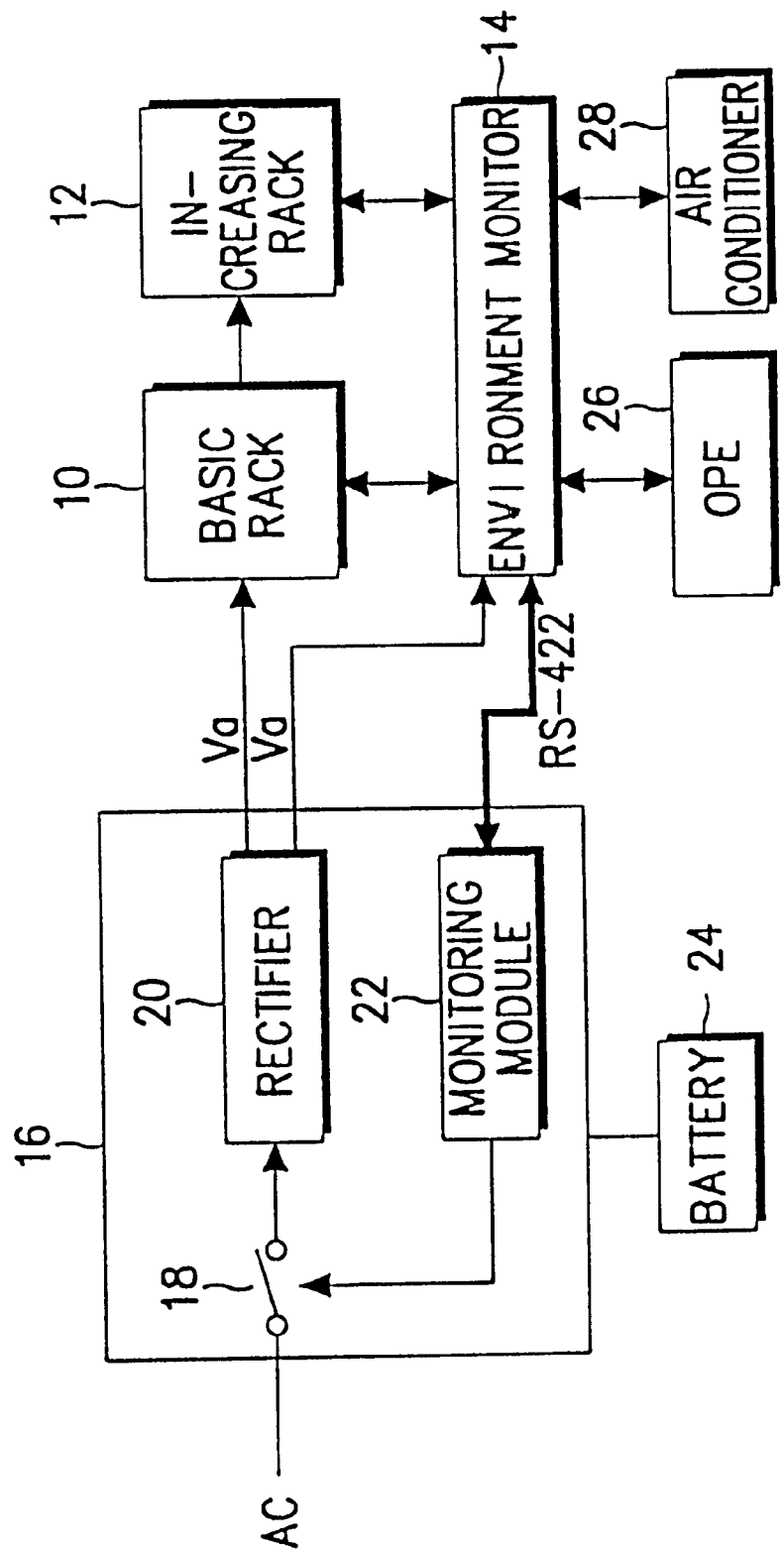
FIG. 1 is a block diagram of a system of an outdoor base station according to an embodiment of the present invention.

FIG. 1 is a block diagram of a system of an outdoor base station according to an embodiment of the present invention. The base station includes a basic equipment rack 10 and an extended equipment rack 12 for performing base station functions. The extended equipment rack 12 is utilized for installing related boards when additional frequency should be allocated due to an increase in use. An environment monitor 14 is adapted to recognize the state of the environment of basic equipment rack 10 and extended equipment rack 12. A power supply control unit 16 rectifies incoming alternating current (AC) to provide direct current (DC) to basic equipment rack 10, extended equipment rack 12 and environment monitor 14. The power supply control unit 16 is composed of a switch 18, a rectifier 20 and a monitoring module 22. One end of the switch is provided with AC and the other end is electrically connected to rectifier 20. The switch 18 is adapted to be responsive to commands (e.g., signals) from monitoring module 22. An operational panel (OPE) 26 is connected to environment monitor 14. Further, an air conditioner 28 is adapted to be controlled by environment monitor 14. A battery 24 supplies auxiliary power in the case of a power failure caused by a defect in rectifier 20.

The environment monitor 14 is installed within basic equipment rack 10 and extended equipment rack 12, and includes various sensors for performing functions such as, for example, temperature sensing, moisture (i.e., humidity) sensing, inundation sensing and door open sensing. Thus, the environment of basic equipment rack 10 and extended equipment rack 12 is monitored by using the above sensors. It is to be appreciated that other sensors for performing other sensing functions may also be included in environment monitor 14.

According to an illustrative embodiment of the present invention, environment monitor 14 transmits a command initiating a power shutdown in the case when, while monitoring the system environment of basic equipment rack 10 and extended equipment rack 12, it encounters a state of system environment which is fatal (i.e., detrimental to the operation of the station equipment). The command (e.g., signal) is transmitted to monitoring module 22 of power supply control unit 16. Conversely, environment monitor 14 transmits a command commencing power when the fatal state of the system environment has lapsed. The monitoring module 22 of power supply control unit 16 switches switch 18 depending upon the command (power shutdown or power commence). The monitoring module 22 sends a response message acknowledging either command to environment monitor 14. In the illustrative embodiment, only basic equipment rack 10 and extended equipment rack 12 are shutdown so that environment monitor 14 can still monitor environmental conditions to determine if and when power should be resumed. However, other components of the system may be similarly designated for shutdown.

Figure 2:
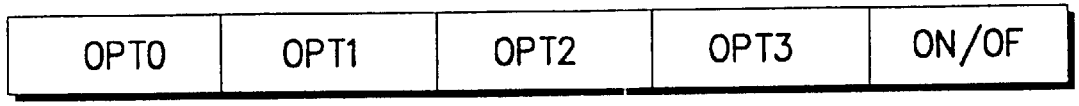
FIG. 2 is a diagram representing the data format of communications between an environment monitor and a rectifier according to an embodiment of the present invention.

An RS-422 communication system provides communication between environment monitor 14 and monitoring module 22. An illustrative embodiment of the data format of these communications is illustrated in FIG. 2. As shown, the data is comprised of option information OP0~OP3, and the information ON/OFF("1"/"0") which displays the power on/off state. Option information OP0~OP3 can correspond to environmental conditions such as, for example, fire, humidity and inundation. However, option information can be randomly varied and added. For instance, option information OP0~OP3 can be utilized to display the power on/off state.

Figure 3:
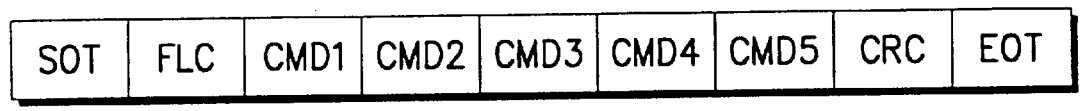
FIG. 3 is a diagram representing the protocol format of communications between the environment monitor and a monitoring module according to an embodiment of present invention.

FIG. 3 is a diagram showing the protocol of the RS-422 communication system according to an embodiment of the present invention, which includes start of text (SOT: 2 bytes), flow control (FLC), control data (CMD1~5), cyclic redundancy check (CRC) and end of text (EOT).

Figure 4:
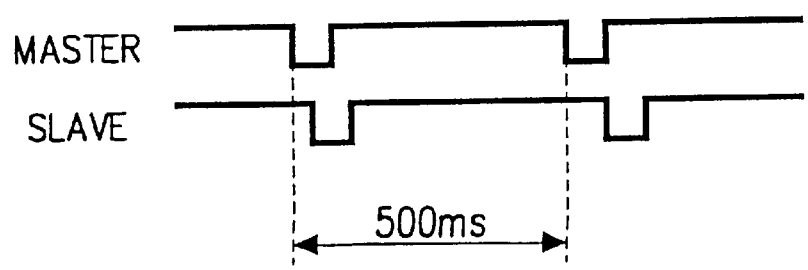
FIG. 4 is a timing diagram showing the environment monitor as the master and the monitoring module as the slave in a master/slave arrangement.

During a data interface, environment monitor 14 operates as a master and monitoring module 22 operates as a slave. FIG. 4 is a timing diagram showing environment monitor 14 as the master and monitoring module 22 as the slave, wherein the allowable communication interval (i.e., period) is about 500 msec and the communication is typically executed within a communication interval of about 200 msec.

In the meanwhile, environment monitor 14 operates air conditioner 28 to adjust the temperature and the moisture of the system, thereby maintaining an optimum operation state in accordance with variations of the system environment. The environment monitor 14 reports the operation state, such as, for example, system power failure, the power supply state, and variations of the system environment, to the upper system. The OPE 26 connected to environment monitor 14 has a liquid crystal display for displaying the current state of the system environment, and various keys for arbitrarily adjusting the set values for the sensing of conditions, such as, for example, temperature/moisture, fire, inundation, and door open.

Figure 5A:
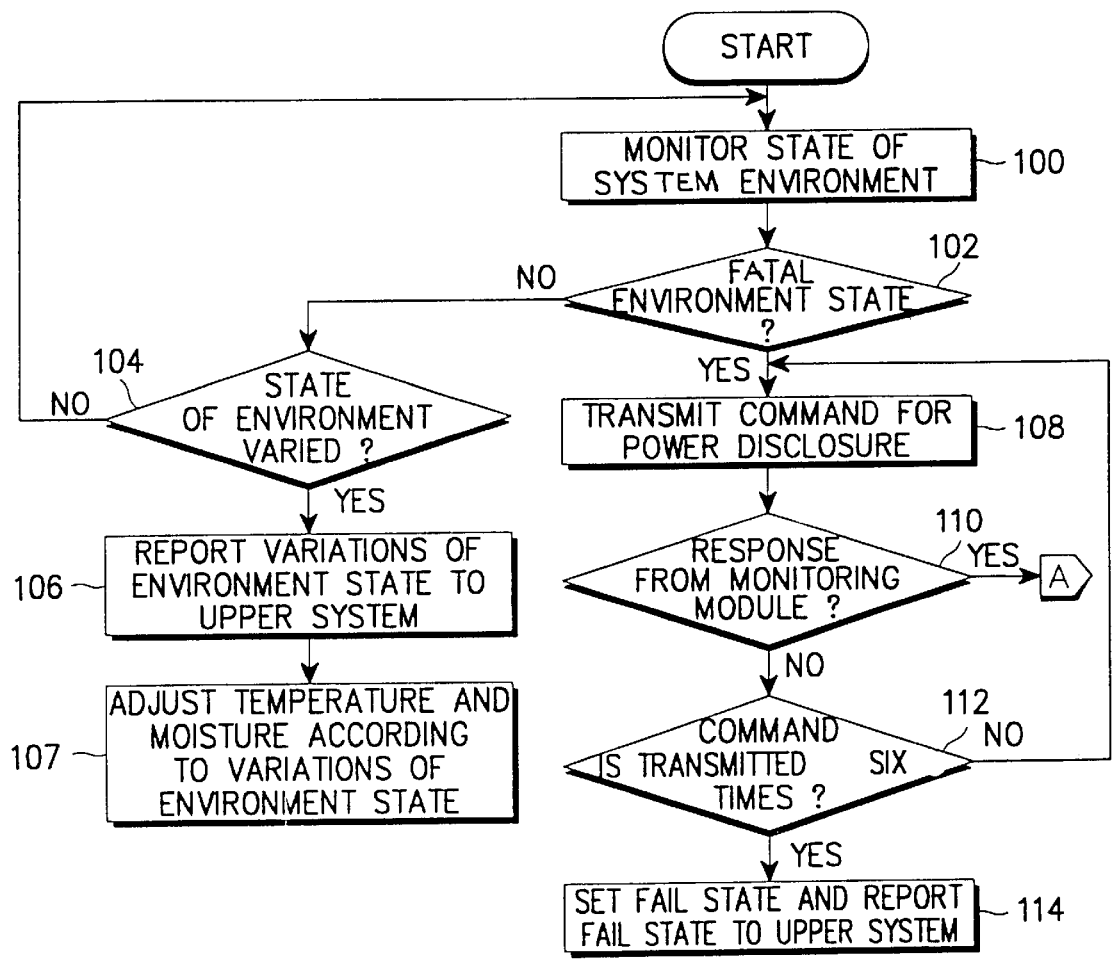
FIGS. 5A and 5B are flow charts illustrating the operations of the environment monitor according to an embodiment of the present invention.
Figure 5B:
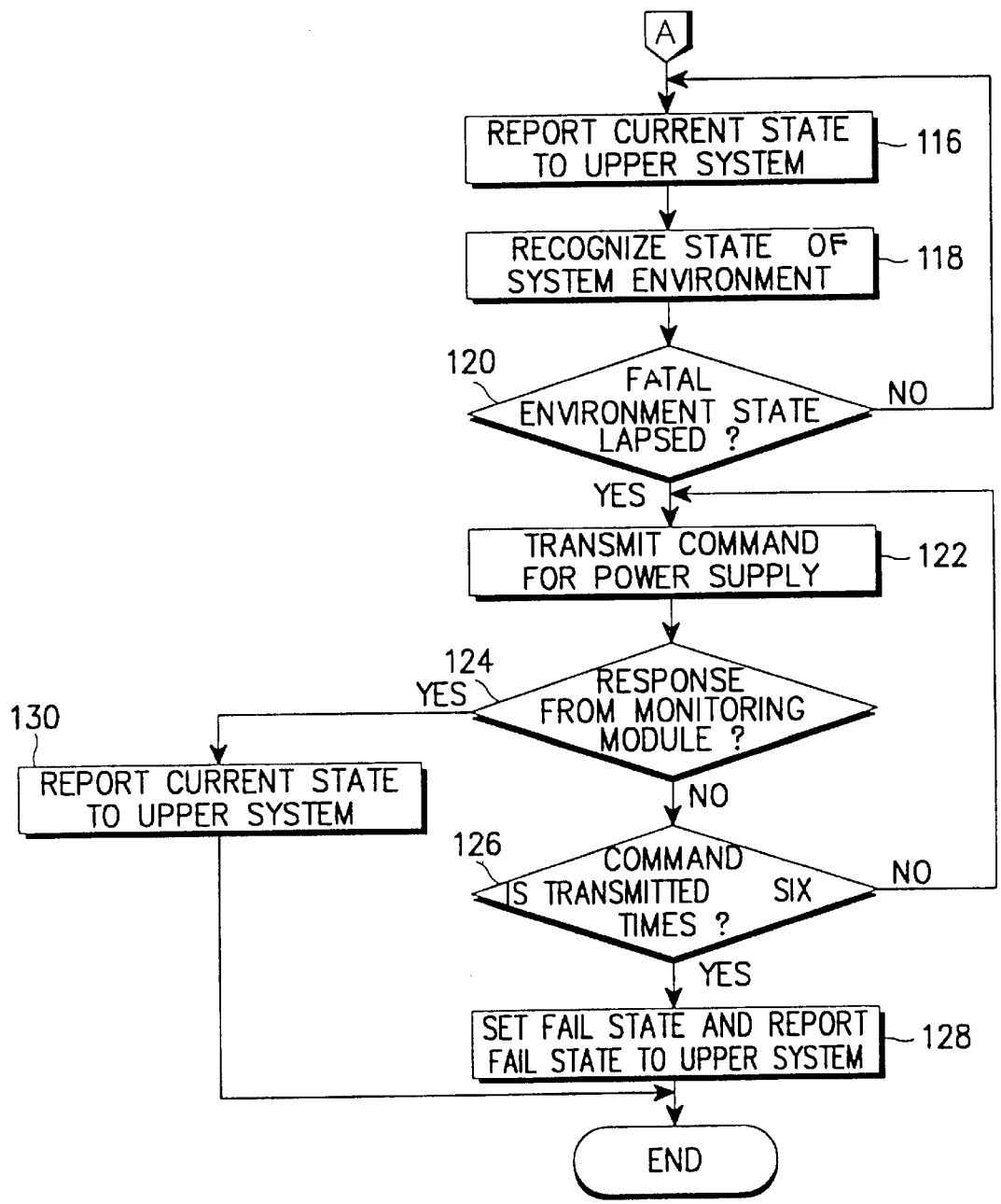

FIGS. 5A and 5B are flow charts illustrating the operations of environment monitor 14 according to an embodiment of the present invention. Referring to FIGS. 5A and 5B, environment monitor 14 monitors the state of the environment of the outdoor base station, including basic equipment rack 10 and extended equipment rack 12, at step 100.

Next, environment monitor 14 checks whether or not a fatal environment state is present, at step 102. If the fatal environment state is not present, environment monitor 14 checks whether or not the state of the environment has varied, at step 104.

If the state of the environment has not varied, environment monitor 14 returns to step 100 and re-performs the corresponding operations. On the other hand, if the state of the environment has varied, environment monitor 14 reports the variation to the upper system at step 106 and adjusts the temperature and the moisture according to the variation at step 107. Depending on the adjustment required, air conditioner 28 operates as an air cooler or as a heater.

However, if a fatal environment state is present when checked at step 102, environment monitor 14 transmits the command for power shutdown to monitoring module 22 of power supply control unit 16, at step 108. The monitoring module 22 of power supply control unit 16 receives the command for power shutdown and switches switch 18 to disconnect the power. The above steps occur automatically.

Next, environment monitor 14 checks whether or not a response has been generated from monitoring module 22 to environmental monitor 14, at step 110. If no response has been generated, it is checked whether the command to shutdown power has been transmitted a predetermined number of times, preferably six times, at step 112. If the command to shutdown has not been transmitted six times and no response has been generated from monitoring module 22, environment monitor 14 returns to step 108 and re-performs the corresponding operations. On the other hand, if the command to shutdown has been transmitted six times without response from monitoring module 22, environment monitor 14 sets the state of the system as fail and reports the fail state to the upper system, at step 114.

However, if a response was generated from monitoring module 22 when checked at step 110, environment monitor 14 proceeds to step 116 and reports the current state of the base station system to the upper system.

Subsequently, environment monitor 14 recognizes the state of the system environment, at step 118, and checks whether or not the fatal state of the environment has lapsed, at step 120. If the fatal state of the environment has not lapsed, environment monitor 14 returns to step 116 and re-performs the corresponding operations. However, if the fatal state of the environment has lapsed, environment monitor 14 proceeds to step 122 and transmits the command for commencing power to monitoring module 22. The monitoring module 22 of power supply control unit 16 receives the command for commencing power and switches switch 18 to supply the power. The above steps occur automatically. Thereafter, a response acknowledging the command for commencing power should be transmitted to environment monitor 14 from monitoring module 22.

Thus, environment monitor 14 checks whether or not a response has been generated from monitoring module 22, at step 124. If a response was generated, environment monitor reports the current state to the upper system, at step 130.

However, if no response has been generated, it is checked whether the command to resume power has been transmitted a predetermined number of times, preferably six times, at step 126. If the command to resume has not been transmitted six times and no response has been generated from monitoring module 22, environment monitor 14 returns to step 122 and re-performs the corresponding operations. On the other hand, if the command to resume has been transmitted six times without response from monitoring module 22, environment monitor 14 sets the state of the system as fail and reports the fail state to the upper system, at step 128.

As apparent from the foregoing, the present invention can protect the outdoor base station system by shutting down power to the base station when the state of the environment is fatal. Additionally, the present invention can re-apply power to the station system when the fatal state has lapsed. Additionally, the present invention can maintain the optimum operation state of the outdoor base station via environment set values implemented through the operational panel so that the air conditioner functions as either an air cooler or a heater, depending on the circumstances.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for monitoring the environment of an outdoor base station to protect the outdoor base station from variations of the environment, the apparatus comprising:

an environment monitor for monitoring the environment of the outdoor base station, for transmitting a command for power shutdown upon detecting a fatal state of environment, and for transmitting a command for resuming power upon detecting a lapse of the fatal state; and a power supply control unit for automatically shutting down power supplied to the outdoor base station in response to the command for power shutdown from the environment monitor, and for automatically resuming power to the outdoor base station in response to the command for resuming power from the environment monitor, wherein said power supply control unit maintains continuous power to the environmental monitor.

2. The apparatus of claim 1, further comprising:

an air conditioner controlled by said environment monitor for adjusting one of the temperature and moisture of the base station according to variations of the environment so as to maintain an optimum operation state of the base station.

3. The apparatus of claim 1, wherein said environment monitor reports states of power shutdown and power resume to an upper system.

4. The apparatus of claim 3, wherein said upper system is selected from the group consisting of a Mobile Switching Center (MSC), a Base Station Manager (BSM), an Operation and Maintenance Center (OMC), and an environment host.

5. The apparatus of claim 1, wherein said power supply control unit is comprised of:

a rectifier for rectifying alternating current and supplying rectified current to the outdoor base station;

a switch for connecting or disconnecting an alternating current to said rectifier; and a monitor for controlling said switch in accordance with the command for power shutdown and the command for resuming power provided by said environment monitor.

6. The apparatus of claim 5, further comprising:

an air conditioner controlled by said environment monitor for adjusting one of the temperature and moisture of the base station according to variations of the environment so as to maintain an optimum operation state of the base station.

7. The apparatus of claim 5, wherein said monitor and said environment monitor interface via an RS-422 communication format.

8. The apparatus of claim 7, further comprising:

an air conditioner controlled by said environment monitor for adjusting one of the temperature and moisture of the base station according to variations of the environment so as to maintain an optimum operation state of the base station.

9. A method for monitoring the environment of an outdoor base station to protect the outdoor base station from variations of the environment, the method comprising:

(a) monitoring the environment of the outdoor base station;

(b) automatically transmitting a command for power shutdown upon detecting a fatal state of the environment;

(c) automatically transmitting a command for resuming power upon detecting a lapse of the fatal state; and (d) maintaining continuous power for the monitoring step.

10. The method of claim 9, further comprising the step of adjusting one of the temperature and the moisture of the base station in accordance with variations of the environment to maintain an optimum operation state of the base station.

11. The method of claim 9, further comprising the step of reporting the occurrence of steps (a) through (c) to an upper system.

12. The method of claim 10, further comprising the step of reporting any adjustment of one of the temperature and the moisture of the base station to an upper system.

13. A method for monitoring the environment of an outdoor base station to protect a system of the base station from variations of the environment, the method comprising:

(a) monitoring the environment of the outdoor base station;

(b) automatically shutting down power to the base station upon detecting a fatal state of the environment;

(c) automatically resuming power to the base station upon detecting a lapse of the fatal state; and (d) maintaining continuous power for the monitoring step.

14. The method of claim 13, further comprising the step of adjusting one of the temperature and the moisture of the base station in accordance with variations of the environment to maintain an optimum operation state of the base station.

15. The method of claim 13, further comprising the step of reporting the occurrence of steps (a) through (c) to an upper system.

16. The method of claim 14, further comprising the step of reporting any adjustment of one of the temperature and the moisture of the base station to an upper system.

* * * * *